United States Patent [19]
Krongos

[11] 3,789,991
[45] Feb. 5, 1974

[54] WATER FILTER DEVICE

[76] Inventor: Zaharias Krongos, 128 Sherman Ave., New York, N.Y. 10034

[22] Filed: Aug. 23, 1971

[21] Appl. No.: 174,084

[52] U.S. Cl.................. 210/317, 210/335, 210/449, 210/460
[51] Int. Cl............................................ B01d 29/24
[58] Field of Search .... 210/459, 449, 446, DIG. 17, 210/460, 302, 315, 316, 317, 323, 340, 335, 338, 342

[56] References Cited
UNITED STATES PATENTS

| | | | |
|---|---|---|---|
| 640,721 | 1/1900 | Vogler................................ | 210/449 |
| 938,947 | 11/1909 | Andres et al. ....................... | 210/449 |
| 3,307,705 | 3/1967 | Halmenschlager........... | 210/DIG. 17 |
| 333,498 | 1/1886 | Bartlett.............................. | 210/449 |
| 604,931 | 5/1898 | Eisendrath......................... | 210/449 |

Primary Examiner—Samih N. Zaharna
Assistant Examiner—T. A. Granger
Attorney, Agent, or Firm—I. William Millen et al.

[57] ABSTRACT

A filter device adapted to be attached to faucets and the like for removing impurities from tap water. The device comprises two sections with a filter member between having a replaceable filter unit. The device is adapted to cause the flow of water to pass through the filter unit for filtering thereof, or if no filtering is desired, water can pass directly through the device unfiltered.

4 Claims, 4 Drawing Figures

PATENTED FEB 5 1974　　　　　　　　　　　　　　3,789,991

INVENTOR
ZAHARIAS KRONGOS

BY　Millen, Raptes & White

ATTORNEYS

3,789,991

WATER FILTER DEVICE

This invention relates to filters of the type adapted to be attached to faucets for the purpose of filtering and clarifying water, and is especially adapted for domestic use in the home or office.

Water obtained from faucets in the home today is usually not as pure and potable as it once was. Due to today's problems with polluted rivers and streams, water obtained from faucets in the homes may contain certain impurities and odors which have not been completely removed by municiple water treatment plants. It is desirable to remove these impurities and odors and the device of this invention accomplishes the desired result.

Accordingly, an object of this invention is to provide a filter device having a casing adapted to be attached to a faucet and wherein said casing contains filtering material.

A further object of this invention is to provide a filter device composed of two sections, which are adapted to be joined together as a unit, which will be inexpensive to manufacture, and which will have replaceable filter elements.

Another object of this invention is to provide a filter device comprising means to permit water from a faucet to be filtered or not, as desired, as it passes through the device.

Many other objects and advantages of the filter device herein described will become apparent to those skilled in the art from the disclosures given, and from the following embodiment of the invention illustrated in the accompanying drawing in which.

Figure 1:
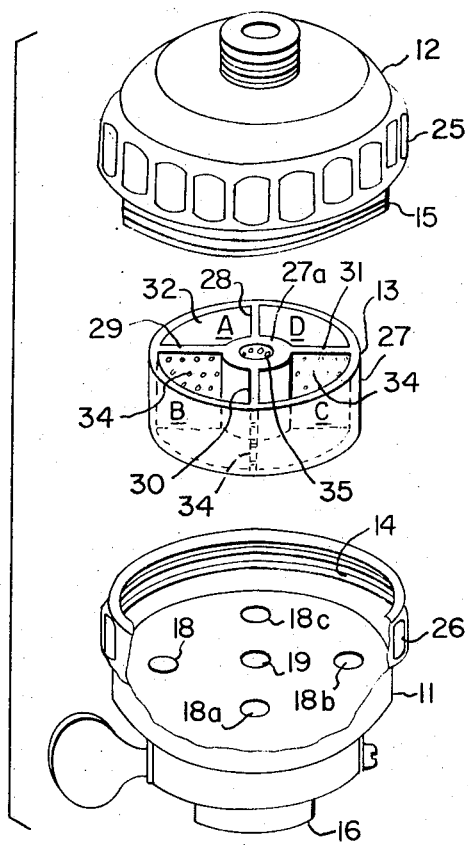
FIG. 1 is a perspective exploded view of the filter device of the invention partially broken away and inverted from the normal use thereof.

Referring now to the drawings, the numeral 10 denotes generally the filter device of the invention. The device is comprised of a first section 11 and a second section 12. A filter unit 13 is adapted to be contained between the two sections 11 and 12, which can be joined together by conventional means such as by screw threads 14 and 15.

First section 11 is provided with a fitting or connector 16 adapted to be connected as by threading 17 or the like to a faucet or source of water. Section 11 comprises four water passageways 18, 18a, 18b and 18c adapted to direct incoming water to the filter unit 13. A central passageway 19 directs water through the center of the filter unit, which does not contain any filter material. A valve 20 comprises a pair of holes 21 and 22 adapted to direct water through passages 18, 18a, 18b and 18c when properly aligned. Hole 23 in valve 20 directs water through passageway 19 when properly aligned.

Second section 12 is provided with a threaded fitting or connector 24 for the purpose of connecting a hose and the like thereto. Both sections 11 and 12 are provided with grooved peripheries 25 and 26 to facilitate joining or taking apart the two sections.

Filter unit 13 (shown without filter material in FIG. 1) is a cup-shaped member comprising a circumferential wall 27, a central hub 27a forming a central passageway 27b, radial walls 28, 29, 30 and 31, which divide the unit into four compartments A, B, C and D, and panel 32 having a plurality of hole openings 33 in the hub portion permitting water to be passed therethrough. Walls 29, 30 and 31 have a plurality of hole openings 34 whereas wall 28 is not provided with hole openings. However, in the compartment D formed between walls 28 and 31, the portion of hub 27a is provided with hole openings 35.

The filter unit 13 is adapted to receive and contain filter material in each compartment. The filter material comprises in each compartment a relatively loose mixture of a suitable filter material 36 such as a combination of wool, cork, fine sand and the like. A more relatively dense suitable filter material plug 37 such as hair, activated charcoal, bits of twisted brush, and the like is contained within a cylindrical member 38. Each member 38 is adapted to be positioned over a respective exit from the passageways 18, a, b and c.

Figure 2:
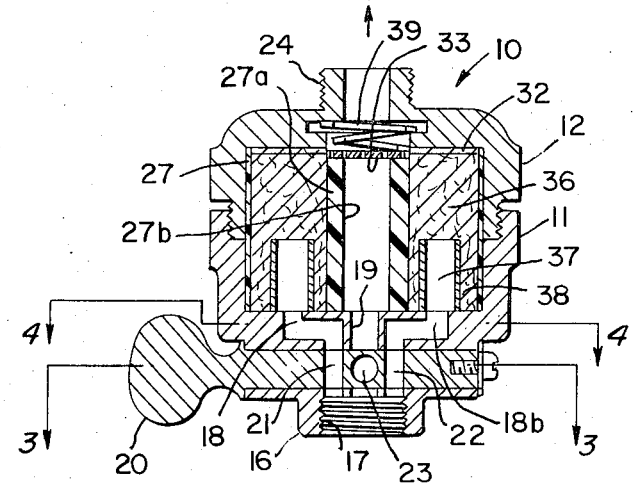
FIG. 2 is a side view of the assembled filter device of FIG. 1 in section taken through its center and inverted from the normal use thereof.
Figure 4:
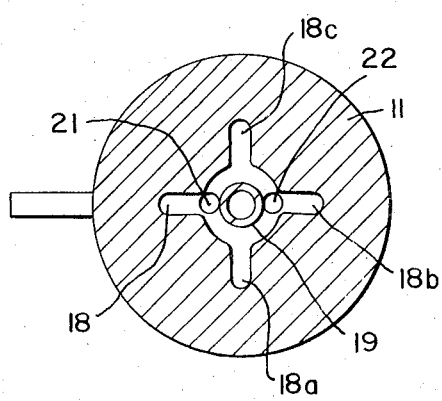
FIG. 4 is a section taken along line 4—4 of FIG. 2.
Figure 3:
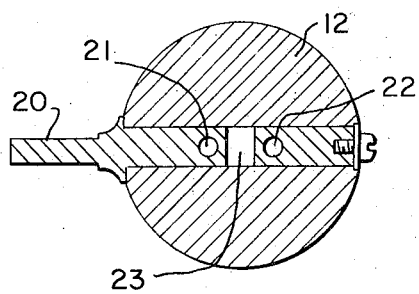
FIG. 3 is a section taken along line 3—3 of FIG. 2.

The assembled filter device in FIG. 2 is shown assembled with the filter unit 13 and filter materials 36 and 37. The filter unit 13 is securely held in place within sections 11 and 12 by means of spring 39. As shown, the valve 20 is turned to a position permitting water entering through entrance connector 16 to pass through holes 21 and 22 into passageways 18, 18a, 18b and 18c, through the filter material 37 in members 38 in each compartment, and thereafter into the filter material 36 in each compartment. As best shown in FIG. 1, the water in compartment A passes into compartment B through hole openings 34 mixes with water therein. The water continues to pass through filter material 36 in each compartment and eventually passes into compartment D through hole openings 34. From compartment D the water passes through hole openings 35 in hub 27b and eventually out of the filter unit through exit connector 24.

When the unit is not desired to be used for filtering of the tap water, valve 20 is turned to line up hole 23 with central passageway 19, thereby forcing entering water to pass through the hub passageway 27b and out through the exit connector 24.

The filter device can be detachably connected to the usual types of facets in kitchen sinks, laundry tubs, wash bowls, etc. in homes, offices, etc. It can be constructed of metal or plastic materials. Whenever the filtering elements or materials become clogged or unusable for purifying and filtering of the tap water, the filter element 13 is removed and replaced with a new element.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A filter device for filtering tap water to remove odors and impurities therefrom comprising:
    a. a first member and a second member adapted to be detachably connected together to form a casing for an enclosed space adapted to contain a filter unit;

b. said filter unit comprising an outer peripheral wall and a central hub with a central water passageway therein, a plurality of compartments formed by radial walls extending between said peripheral wall and said hub, each of said radial walls except one containing a plurality of openings for the passage of water, a plurality of holes in said hub facing adjacent the compartment formed with said radial wall with no openings, a dense cylindrical filter element disposed in each of said compartments and a less dense filter material disposed throughout and within each of said compartments;

c. said first member comprising a water inlet connector adapted to be fitted to a water source, passageways for directing water into said dense cylindrical filter elements of said filter unit, a passageway for directing water into said central passageway of said filter unit hub, and a valve member for directing water from said inlet to either said passageways to said filter unit or to said central passageway;

d. said second member comprising an outlet water connector adapted to receive water from said central passageway of said filter unit.

2. The filter device of claim 1, wherein said filter unit is retained within said casing by a spring member disposed in said second member.

3. The filter device of claim 1 wherein said first and second members are provided with screw threads for connecting the members together.

4. The filter device of claim 1 wherein said filter unit is divided into four compartments and said first member comprises four passageways each of which direct incoming water to a respective compartment.

* * * * *